United States Patent
Giebel et al.

(10) Patent No.: US 9,524,410 B2
(45) Date of Patent: Dec. 20, 2016

(54) METHOD AND SYSTEM FOR OPTIMIZING SYSTEM SETTINGS OF A LASER SCANNER CONTROL SYSTEM

(71) Applicant: SYMBOL TECHNOLOGIES, INC., Schaumburg, IL (US)

(72) Inventors: James Giebel, Centerport, NY (US); Vladimir Gurevich, Stony Brook, NY (US); Peter Fazekas, Bayport, NY (US); Dariusz Madej, Shoreham, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 234 days.

(21) Appl. No.: 14/341,897

(22) Filed: Jul. 28, 2014

(65) Prior Publication Data

US 2014/0332592 A1   Nov. 13, 2014

Related U.S. Application Data

(62) Division of application No. 11/864,530, filed on Sep. 28, 2007, now Pat. No. 8,820,645.

(51) Int. Cl.
*G06K 7/10*  (2006.01)
*G06K 7/14*  (2006.01)

(52) U.S. Cl.
CPC ........ *G06K 7/10584* (2013.01); *G06K 7/10801* (2013.01); *G06K 7/10851* (2013.01); *G06K 7/1408* (2013.01)

(58) Field of Classification Search
USPC .................................................. 235/462.22
See application file for complete search history.

(56) References Cited

U.S. PATENT DOCUMENTS

| | | | | |
|---|---|---|---|---|
| 4,399,437 A * | 8/1983 | Falck | ....................... | B07C 3/12 |
| | | | | 235/380 |
| 5,945,658 A * | 8/1999 | Salatto, Jr. | ......... | G06K 7/10574 |
| | | | | 235/462.22 |
| 6,478,225 B1 * | 11/2002 | Swartz | ............... | G06K 7/10633 |
| | | | | 235/462.22 |
| 6,691,919 B1 * | 2/2004 | Katz | .................. | G06K 7/10881 |
| | | | | 235/462.01 |
| 2001/0000907 A1 * | 5/2001 | Knowles | .............. | G02B 26/106 |
| | | | | 235/462.22 |
| 2004/0074968 A1 * | 4/2004 | Lucera | ................. | G02B 26/106 |
| | | | | 235/462.14 |
| 2005/0110586 A1 * | 5/2005 | Klement | ................ | G02B 7/008 |
| | | | | 331/154 |
| 2005/0199725 A1 * | 9/2005 | Craen | ...................... | G02B 3/14 |
| | | | | 235/462.22 |
| 2005/0230480 A1 * | 10/2005 | Kolstad | .............. | G06K 7/10851 |
| | | | | 235/462.26 |
| 2006/0065734 A1 * | 3/2006 | Sackett | .................... | G06K 7/14 |
| | | | | 235/462.25 |

(Continued)

*Primary Examiner* — Michael G Lee
*Assistant Examiner* — David Tardif
(74) *Attorney, Agent, or Firm* — Nong-Qiang Fan (57) ABSTRACT

A scanning device includes a laser source emitting a laser scanning beam, a movable scanning mirror reflecting the laser scanning beam towards an on object to be scanned, a mirror moving element moving the movable scanning mirror and a controller receiving an input corresponding to a range estimate from the scanning device to the object and adjusting a setting of the scanning device based on the range estimate.

7 Claims, 4 Drawing Sheets

(56) References Cited

U.S. PATENT DOCUMENTS

| | | | |
|---|---|---|---|
| 2007/0057064 A1* | 3/2007 | Schneider | G06K 7/10851 235/462.33 |
| 2007/0290044 A1* | 12/2007 | Zhu | G06K 7/10732 235/462.42 |
| 2008/0197198 A1* | 8/2008 | Barkan | G06K 7/10702 235/462.36 |

* cited by examiner

F I G. 3

METHOD AND SYSTEM FOR OPTIMIZING SYSTEM SETTINGS OF A LASER SCANNER CONTROL SYSTEM

FIELD OF INVENTION

The present application generally relates to systems and methods for optimizing the system settings of an electronic device, such as a laser scanner control system. Specifically, the exemplary system and methods may maximize laser power while adapting system parameters such as motor amplitude, receiver bandwidth, etc., in order to best match the operation of the control system with the needs of the target symbol.

RELATED APPLICATIONS

This is a divisional of U.S. patent application Ser. No. 11/864,530, filed Sep. 28, 2007.

BACKGROUND

Barcodes are machine-readable (e.g., computer readable) representations of information on a surface. Optical scanning devices such as laser-based barcode scanners and image-based scanners are used in a multitude of situations for both personal and business purposes. A variety of barcode readers and laser scanning devices have been developed to decode these bar symbols into a multiple-digit representation of information such as inventory checks, delivery tracking, product sales, etc.

Certain portable barcode scanners incorporate laser diodes that allow the user to scan the target barcode symbols at various distances from the surface on which the barcode resides. Typical barcodes are formatted as two-dimensional matrices and include vertical bar symbols such as, dark and light bars of varying widths. When light is projected onto these symbols, the light is mostly absorbed by the dark bars of the symbol and mostly scattered by the light bars of the symbol. Accordingly, the pattern of symbols may be read by photo-detectors within the scanner or imager devices. In addition, normal usage may require different operating positions in which a target symbol may be at varying distances and/or angles from the barcode scanner. However, a conventional barcode laser scanner only uses one laser power setting and one motor amplitude setting, regardless of the distance to the target symbol.

SUMMARY OF THE INVENTION

The present invention relates to a scanning device having a laser source emitting a laser scanning beam, a movable scanning mirror reflecting the laser scanning beam towards an on object to be scanned, a mirror moving element moving the movable scanning mirror and a controller receiving an input corresponding to a range estimate from the scanning device to the object and adjusting a setting of the scanning device based on the range estimate.

The present application also relates to a method for determining a range estimate from a scanning device to an object to be scanned and adjusting a setting of the scanning device based on the determined range estimate.

DETAILED DESCRIPTION

The exemplary embodiments of the present invention may be further understood with reference to the following description of exemplary embodiments and the related appended drawings, wherein like elements are provided with the same reference numerals. The present invention is related to systems and methods used for optimizing the system settings of an electronic device, such as a laser scanner control system. Specifically, the system and methods for automatically adjusting system parameters of the electronic device based on one or more properties of a target symbol. The adjustment made to the system parameters may include adjusting motor amplitude and adjusting receiver bandwidth in order to dynamically adapt the device for reading a target symbol based on observable conditions, such as a scanning range of the symbol. It should be noted that throughout this description, the term "motor amplitude" may be used interchangeably with the term "scan amplitude" to refer to the amplitude of oscillation for a scanning motor within a laser scanning device. Furthermore, the terms "motor angle" and "scan angle" may both be used to describe a measurement of the motor amplitude in degrees from a normal position.

The exemplary systems and methods of the present invention allow for an increase in laser power from a scanning device without exceeding class limits, thereby optimizing the performance of the scanning device on a per-session basis. Furthermore, the exemplary embodiments of the present invention allow for a reduced bandwidth of the receiver, thereby improving the signal to noise ratio ("SNR") of the received signals. Other exemplary embodiments of the present invention to improve the SNR will also be discussed. Thus, the laser scanners may benefit from a significant performance advantage, and may easily switch from a normal barcode-reading range to a longer barcode-reading range, thereby improving the overall versatility of the device.

Throughout this description, the exemplary embodiments will be described with reference to scanning a barcode symbol or target symbol. Those skilled in the art will understand that this includes any type of laser scannable symbol, e.g., 1-D barcode symbol (or "linear barcodes"), 2-D barcode, etc. In addition, the present invention is not limited in application to laser scanners used for scanning symbols, but may also be applied to any type of laser scanner.

Figure 1:
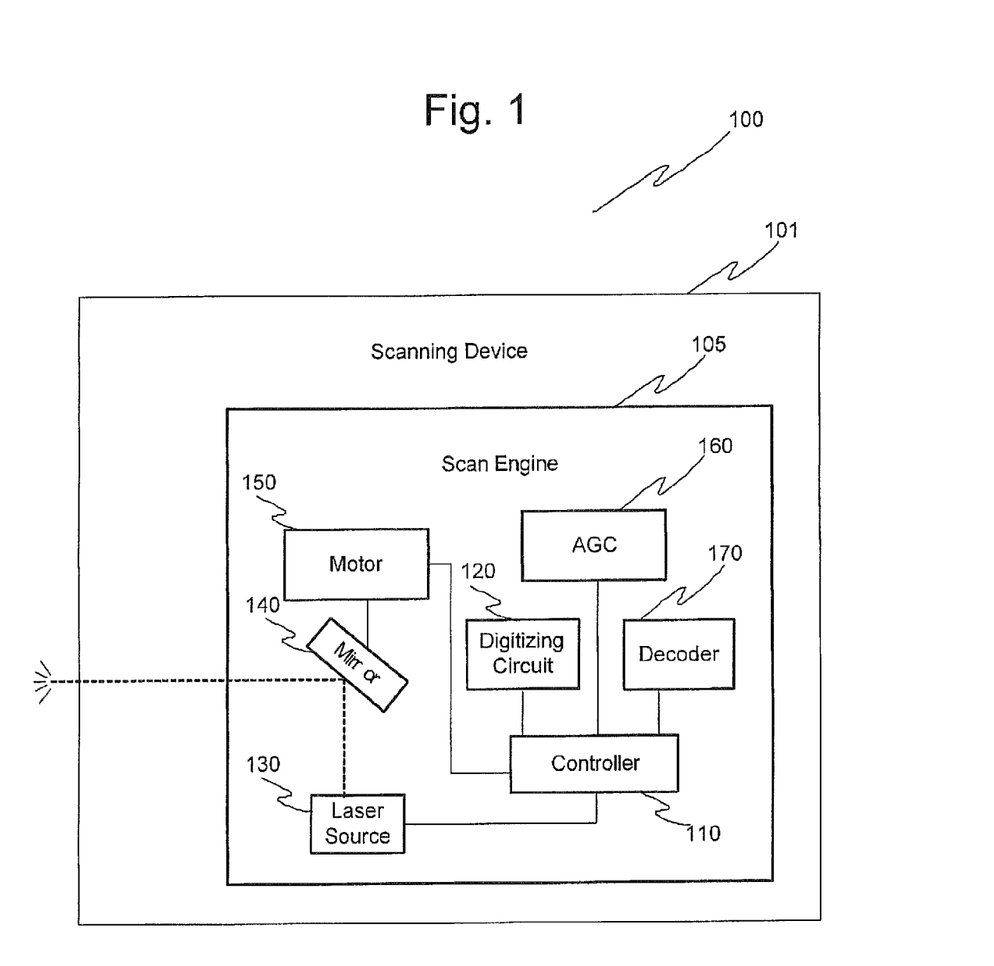
FIG. 1 shows an exemplary system for dynamically adjusting one or more system parameters of an electronic device, such as a laser scanner, according to the exemplary embodiments of the present invention.

FIG. 1 shows an exemplary system 100 for dynamically adjusting one or more system parameters of an electronic device, such as a laser scanning device 101, according to the exemplary embodiments of the present invention. According to the exemplary embodiment, FIG. 1 shows a block diagram view of the scanning device 101 according to the present invention, wherein the scanning device 101 includes a scan engine 105. The scan engine 105 may control the scanning functions, the detection of optical barcode signals, and the conversion (i.e., digitization) of the optical barcode signals into a digital electrical signal (e.g., a digital bar pattern ("DBP")). Specifically, the scan engine 105 include various electrical components such as a controller 110, a digitizer circuit 120, a laser source 130, an oscillating mirror 140, a scanning motor 150, an automatic gain control ("AGC") 160, and a decoder 170. Furthermore, the scan engine 105 may include additional components for filtering out noise (e.g., ambient light), for enhancing edges between bars and spaces of optical barcode signals, for rejecting "false edges" from noisy signals, and providing signals within a suitable range for the digitizer circuit 120. Accordingly the laser scanner device 101 may optimize scanning performance over a wide variety of scanning ranges, barcode densities, signal depth of modulation, etc.

The functions of the controller 110 may include managing the laser output power from the laser source 130, adjusting the motor amplitude of the scanning motor 150, and maintaining electronic beam clipping points of the laser in order to best meet the scanning requirements of a particular scanning session. Specifically, the controller 110 may regulate the operation of the scan engine 105 within the scanning device 101 by facilitating communications between the various components. For example, the controller 110 may include a microprocessor, an embedded controller, a further application-specific integrated circuit, a programmable logic array, etc. The controller 110 may perform data processing, execute instructions and direct a flow of data between devices coupled to the controller 110 (e.g., the digitizer circuit 120, the laser source 130, the oscillating mirror 140, the scanning motor 150, and the AGC 160, etc.). As will be explained below, the controller 110, according to the exemplary embodiments of the present invention, may be used to program and configure various parameters of the scanning device.

When a user of the scanning device 101 activates the scan engine 105 (e.g., via a triggering mechanism, etc.), the light source 130 generates a beam that traverses through one or more lens towards the oscillating mirror 140. The scanning motor 150 may control the oscillation of the mirror 140 and thereby direct the beam as it strikes the mirror 140. The beam may be directed by the mirror 140 in various patterns and scanning angles, or scanning amplitudes. Specifically, as the motor 150 oscillates the mirror 140, the laser beam (e.g., a laser spot of the beam) may be swept across a target. The displacement of the laser spot may be sinusoidal (e.g., around 50 Hz). The mirror 150 may be used to send the laser beam out from the scanning device 101 and to receive a reflected signal from the target barcode. According to the exemplary embodiments of the present invention, a unique laser output power may be used for each scanning angle setting. Due to laser safety issues, the laser output power for each of the scanning angle setting may be reduced as the scanning amplitude is reduced. Conversely, the laser power output power may be increased for larger scanning amplitudes.

Figure 2A:
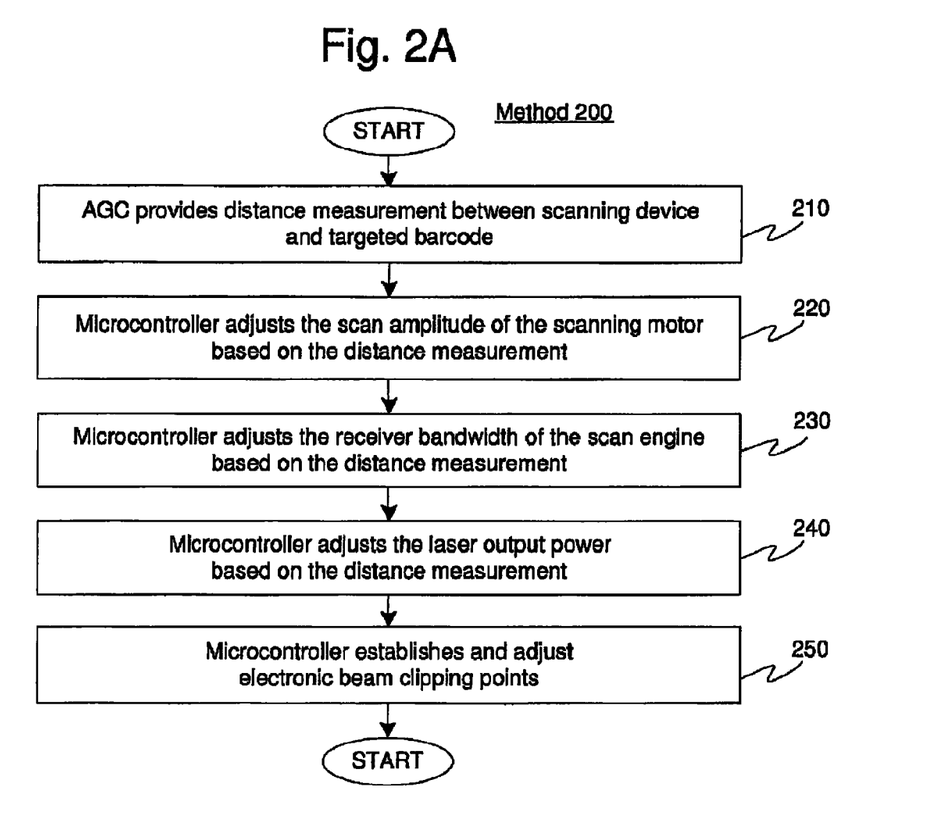
FIG. 2A represents an exemplary method for optimizing the performance of the scanning device according to the exemplary embodiments of the present invention.

FIG. 2A represents an exemplary method 200 for optimizing the performance of the scanning device 101 according to the exemplary embodiments of the present invention. The exemplary method 200 will be described with reference to the exemplary system 100 of FIG. 1. In step 210 of the method 200, the AGC 160 may provide a distance measurement (e.g., range information) between the scanning device 101 and a targeted barcode. Specifically, the receiver gain measurement from the AGC 160 may be digitized and transmitted to the controller 110 for processing. According to one embodiment of the exemplary method 200, the AGC 160 may provide a best estimate of the range information to the controller 110. According to an alternative embodiment, the gain measurement from the AGC 160 may be determined to lie in one of a plurality of coarse range categories in order to estimate the range to the targeted barcode (e.g., near-range, mid-range, far-range, etc.).

Figure 2B:
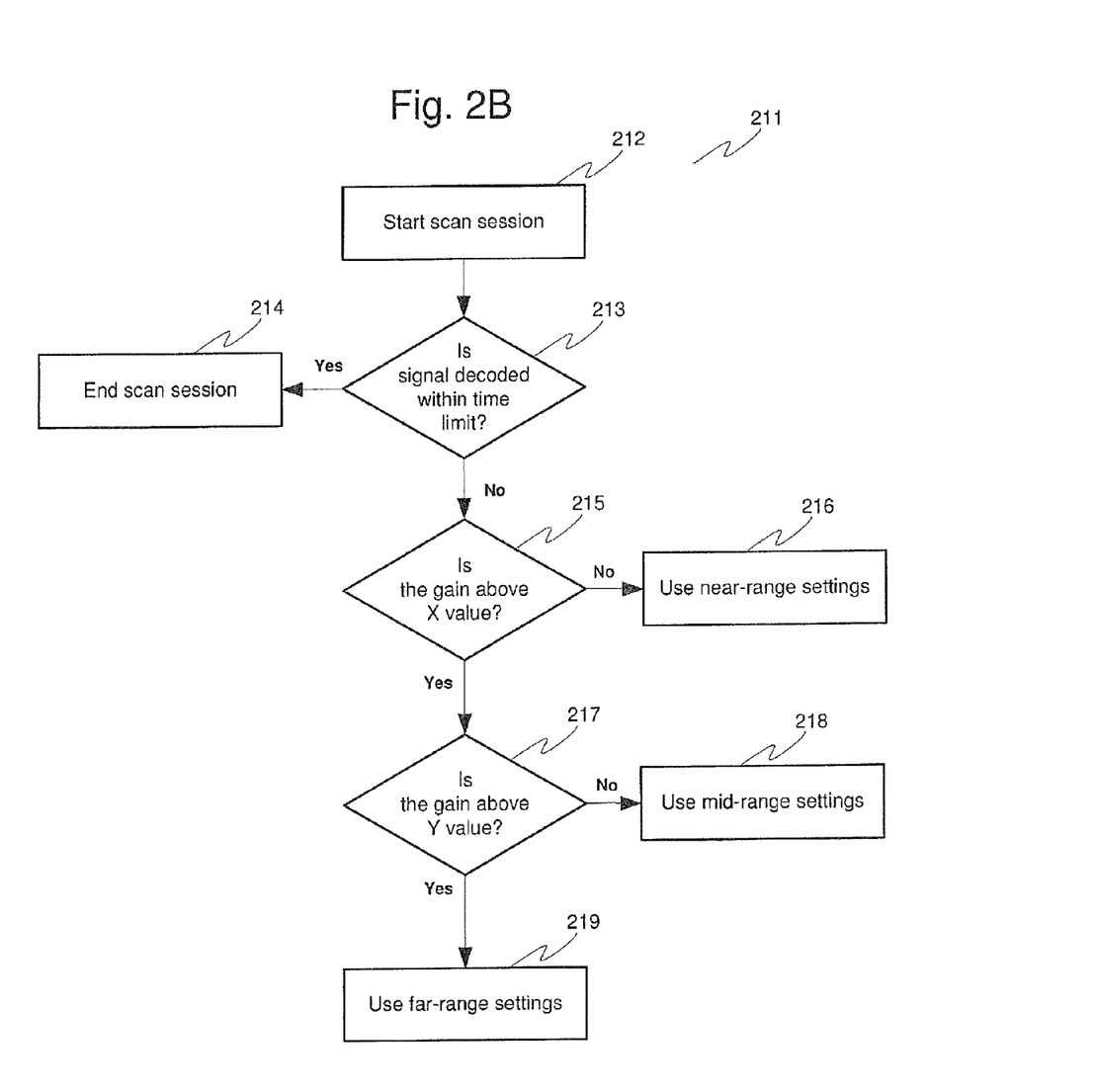
FIG. 2B illustrates an exemplary method for selecting a predetermined range setting via the receiver gain measurements detected by the AGC.

For example, FIG. 2B illustrates an exemplary method 211 for selecting a predetermined range setting via the receiver gain measurements detected by the AGC 160. At the beginning of the method 211, the AGC 160 may have a default range setting, such as a near-range setting. Furthermore, the AGC 160 may have threshold receiver gain values for additional settings, such as a receiver gain threshold value of X for a mid-range setting, and a receiver gain threshold value of Y for a far-range setting. Furthermore, according to an alternative, or additional embodiment of the present invention, the scan engine 105 may also include an AGC feedback signal that may be used to estimate the distance to the target barcode.

In step 212, the scanning device 101 may start a scan session. A scan session may be defined as the period of time between a user activating the scanning device 101 and the decoder 170 decoding the digitized barcode signal (e.g., when the scanning device 101 translates the optical barcode signal). In step 213, a determination may be made as to whether or not the decoder 170 was able to decode the barcode signal. Specifically, a maximum time limit may be placed, such as, for example, 1 second, for allowing the decoder 170 to decode the signal. Accordingly, if the decoder 170 decodes the signal within the time limit, the method 211 may advance to step 214 wherein the scan session may be terminated. However, if the decoder 170 fails to decode the signal within the time limit, the method 211 may advance to step 215.

In step 215, the method 211 may examine the receiver gain measured by the AGC 160. Furthermore, the method 211 may determine whether the receiver gain is below a first threshold (e.g., the threshold value of X for the mid-range setting). If the receiver gain is below the first threshold, the method 211 may advance to step 216, wherein the controller 110 may set the scanning device 101 to use the near-range settings. As will be described in more detail below, exemplary near-range settings may include a bigger scanning amplitude, a higher receiver bandwidth, a higher laser power and less clipping of the image. The terms "bigger," "higher" and "less" are relative terms referring to the settings of the device in relation to, for example, mid-range and far range settings (discussed in more detail below). The actual settings for each of these parameters and any other adjustable parameters based on the range of the targeted barcode may depend on the specifics of the individual scanning device.

Returning to the method 211, if the receiver gain is above the first threshold, the method 211 may advance to step 217. In step 217, the method 211 may determine whether the receiver gain is below a second threshold (e.g., the threshold value of Y for the far-range setting). If the receiver gain is below the second threshold, the method 211 may advance to step 218, wherein the controller 110 may set the scanning device 101 to use the mid-range settings. Again, exemplary mid-range settings may include reducing the scanning amplitude from the near-range setting, reducing the receiver bandwidth from the near-range setting, reducing the laser power from the near-range setting and increasing the clipping of the image from the near-range setting. However, if the receiver gain is above the second threshold, the method 211 may advance to step 218, wherein the controller 110 may set the scanning device 101 to use the far-range settings. Exemplary far-range settings may include a further reduction of the scanning amplitude from the mid-range setting, a further reduction of the receiver bandwidth from the mid-range setting, a further reduction of the laser power from the mid-range setting and a further increase of image clipping from the mid-range setting. Thus, the method 211 may use the receiver gain measured at the AGC 160 to determine a distance between the scanning device 101 and the target barcode. It should be noted that while method 211 utilizes three varying range settings based on the receiver gain measurement, the exemplary systems and methods of the present invention may utilize any number of range settings, wherein each range setting may have a distinct threshold value for the receiver gain. It should also be noted that the above settings are only exemplary and that each setting does not need to be adjusted for each differing range. For example, it may be that in the mid-range, the laser power is set to a maximum allowable value. Thus, when the scanning device determines that it should switch to near-range settings, the laser power will remain the same as in the mid-range because the laser power should not be set above the maximum allowable value.

Returning to method 200, in step 220, the controller 110 may adjust the scan amplitude of the scanning motor 150 based on the distance, or distance range, determined in step 210. As opposed to conventional scanning devices that only utilize a single scan amplitude, the exemplary embodiments of the present invention allow the controller 110 of the scanning device 101 to dynamically adjust the scan amplitude based on a determined distance or range. For example, a conventional scanning device may have a fixed scan amplitude of 50 degrees. However, this scan amplitude may be too wide for a targeted barcode that is far away from the scanning device. Accordingly, the large receiver bandwidth associated with the wide scan amplitude may result in a DBP signal that the decoder 170 cannot accurately decode. Therefore, according to this example, in step 220 the controller 110 may adjust the scan amplitude to a narrower scan angle, such as 25 degrees, thereby narrowing the projected spread of the sweeping laser spot as the motor 150 oscillates the mirror 140. Having a lower scan angle may result in a decrease in the frequency content of the received bar code signal, while the noise frequency remains mostly unchanged. Therefore a low-pass filter may be used to separate the noise from the signal more efficiently. Thus, in this case, the low-pass filter may improve the SNR. It should be noted that the spot speed (i.e., speed of the laser as it sweeps) may be a function of the scan amplitude and the distance to the target barcode. Therefore, the conventional scanning device may use a spot speed that is fixed at too high of rate, wherein the frequency content of the information signal received from the target has too wide of a frequency spread. Thus, adjustments made to the scan amplitude may allow for a reduction to the frequency content of the received signal and a corresponding decrease in the receiver bandwidth, thereby improving the SNR. For example, decreasing the scan amplitude from 50 degrees to 25 degrees may result in reducing the spot speed in half, thereby, in turn, reducing the frequency content of the information signal.

In step 230, the controller 110 may adjust the receiver bandwidth of the scan engine 105. The receiver bandwidth may be defined as the range of frequencies accepted by the scan engine 105 to receive the barcode signal. According to one exemplary embodiment of the present invention, the scan engine may include a receiver (not shown) having a programmable receiver bandwidth, wherein the receiver bandwidth may be modified by the controller 110 in order to best match the scan amplitude selected in step 220. The receiver bandwidth may be adjusted and may have a direct relationship to the SNR, wherein a smaller bandwidth improves the SNR but may, however, cause spatial distortions in the signal. A larger receiver bandwidth reduces the SNR (e.g., there is more noise from the extremes of the spectrum), however a larger receiver bandwidth allows for a higher spot speed and larger scan angles. It should be noted that any adjustments made by the microprocessor 110 to the scan amplitude in conjunction with adjustments made to the receiver bandwidth may result in an improved SNR, and may also reduce the spot speed of the laser beam.

According to an alternative, or additional, exemplary embodiment of the present invention, the scanning device 101 may include an information signal frequency estimator (not shown), wherein the receiver bandwidth is modified by the controller 110 in order to best match the targeted barcode. The estimator may estimate the frequency content of the received information signal by measuring the DBP transition timing. For example, if the estimator measures an average value of narrow elements within the DBP pattern is only 20 KHz, the controller 110 may adjust the receiver bandwidth from a default setting (e.g., 170 KHz) to a setting of 20 KHz. The adjusted receiver bandwidth may result in a significant SNR benefit.

According to a further alternative, or additional, exemplary embodiment of the present invention, the digitizer circuit 120 of the scanning device 101 may include a margin timeout circuit, wherein the margin timeout is adjusted in proportion to any adjustments made to the receiver bandwidth. The margin timeout circuit may be a noise gate in the scanning device 101. The timeout circuit may remain closed until a signal crosses a threshold setting for valid information. While opening the timeout circuit may be easily achieved, the closing of the circuit may be delayed, thereby allowing unwanted noise in the signal to be digitized with the valid information. A receiver bandwidth signal of a lower frequency may have a slower laser spot speed, thereby limiting the noise received in the signal. Thus, the setting for the threshold may be adjusted in response to adjustments made to the receiver bandwidth, wherein the noise gate may have a more lenient threshold hold when the receiver bandwidth is low, and vice versa. In addition, the digitizer circuit 120 may further include a received signal noise estimator, wherein the sensitivity, settings of the digitizer 120 is adjusted to best match the targeted barcode. While conventional digitizers may cycle through a number of settings, the exemplary digitizer 120 may efficiently determine a suitable sensitivity setting based on the received signal noise estimator.

In step 240, the controller 110 may adjust the laser output power of the laser source 130 in order to optimize the performance of the scan engine 105 while ensuring that the scanning device 101 remains compliant with any laser emission regulations. According to laser emission regulations, the laser output power may be directly related to the scan amplitude. In other words, a scanning device having a larger scan amplitude may be allowed a greater laser output power than a device having a smaller scan amplitude. In addition, it should be noted that the scan engine 105 may include a further receiver (not shown) having an adjustable gain that supports on-the-fly gain changes in order to compensate for any changes made to the laser output power. According to an alternative, or additional, exemplary embodiment of the present invention, the controller 110 may instruct the laser source 130 to selectively turn off the laser beam on alternate scans, thereby reducing the average laser power in half. At the expense of a more effective scan rate, this decrease in average laser power may allow the laser source 130 to increase the laser output power while remaining within safety limits. In other words, an increase in instantaneous laser power on any one scan may improve the SNR, and turning off the laser on alternate scans will reduce the average power, thereby allowing for the increased laser power.

According to a further alternative, or additional, exemplary embodiment of the present invention, the controller 110 may measure the angular speed of the oscillating mirror 140. Accordingly, the angular velocity of the mirror 140 may be used to modulate the laser output power, such that the laser power is proportional to the angular speed.

In step 250, the controller 110 may establish and adjust settings for electronic beam clipping points on the spread of the projected laser. As an exemplary laser beam oscillates between two endpoints of the scanning spread, the laser spot must decrease in velocity as it approaches either one of the endpoints. The oscillating laser beam may safely oscillate from one endpoint to the other. As the laser spot reaches the endpoints of the scan, the velocity of the laser spot will decrease. However, the laser spot must meet regulatory requirements at both the higher velocity in the central portion of the scan and at the lower velocity at the edges of the scan. Therefore, according to the exemplary embodiments of the present invention, the controller 110 may implement electronic beam clipping to "clip" or turn off the laser beam as the laser spot approaches either one of the endpoints (e.g., as the speed of the laser spot approaches, and reaches, a zero velocity). Specifically, a predetermined threshold velocity may be established by the controller 110 that may trigger the deactivation of the laser beam at the laser source 130.

By clipping the beam, and eliminating any instances where the laser spot is at a low or zero velocity, the controller 110 may be allowed to increase the laser output power while maintaining compliance with laser emission regulations. Furthermore, the controller 110 may dynamically adjust the electronic beam clipping locations in order to maximize the laser output power based on the distance determined for the target barcode in step 210. In other words, more of the laser beam may be clipped when the targeted barcode is far away, thereby permitting an increase in the laser output power. Conversely, when the targeted barcode is within a closer range, the controller 110 may clip less of the beam (while decreasing laser output power) in order to achieve greater barcode coverage near contact.

The dynamic adjustments of the electronic beam clipping points may not proportionately impact the SNR. The controller 110 may determine a fraction of the scan session that is being used to detect barcode information. The controller 110 determines a portion of time the scan sweep that contains relevant barcode data packets, wherein the remaining portion may be considered noise. When the barcode is determined to be too far away in step 210, then less time may be used to receive barcode data packet. Accordingly, the controller 110 may reduce the scan amplitude in step 220, reduce the receiver bandwidth in step 230, increase the laser output power in step 240, and clip a greater portion of the laser beam sweep in step 250.

As described above, an alternative exemplary embodiment of the present invention may support a few preset scan angles (e.g., near-range, mid-range, and far-range). According to this alternative embodiment, each of the scan angles may be associated with a setting having a unique receiver bandwidth, laser output power, corresponding electronic beam clipping points, etc. These associated settings may be stored in a memory (not shown) of the scanning device 101 and may be calibrated (e.g., automatically, manually, etc.) based on the operating procedures of the scanning device 101. The controller 110 may start scanning operations at the smallest scan angle setting. Based on the range information provided by the AGC 160, the controller 110 may then choose the next scan angle setting (and associated laser power, beam clipping points, etc.). Accordingly, the controller 110 may use simple algorithms to adjust the scan angle, wherein the closer the target barcode is determined, the larger the scan angle, the larger the receiver bandwidth, the greater the laser output power, and the wider the electronic beam clipping points may be set.

While the AGC 160 described in the above embodiments may be used to determine a distance from the scanning device 101 to a barcode target (e.g., the gain may be correlated to a distance), the AGC 160 may also be used to dynamically adjust overall receiver gain of the scan engine 105. Alternatively, it should be noted that the AGC 160 may be used primarily for distance calculations and an additional AGC (not shown) may be implemented within the scanning device 101 to adjust the receiver gain. The additional AGC may adjust faster than the AGC 160. The receiver gain may be defined as the ratio of an output barcode signal from the scanning device 101 to an input barcode signal. Specifically, the additional AGC may monitor and regulate peak averages of the output signal of the scan engine 105. The scan engine 105 may include a plurality of amplifier stages to deliver a large overall gain from the input to the output. The additional AGC may detect and filter the output signal, resulting in a direct current voltage that is proportional to the average peak value of the received input signal. The additional AGC may then compare the average peak value of the output signal to a fixed direct current reference voltage, and dynamically adjust the receiver gain in order to reduce any difference between the two voltages.

Figure 3:
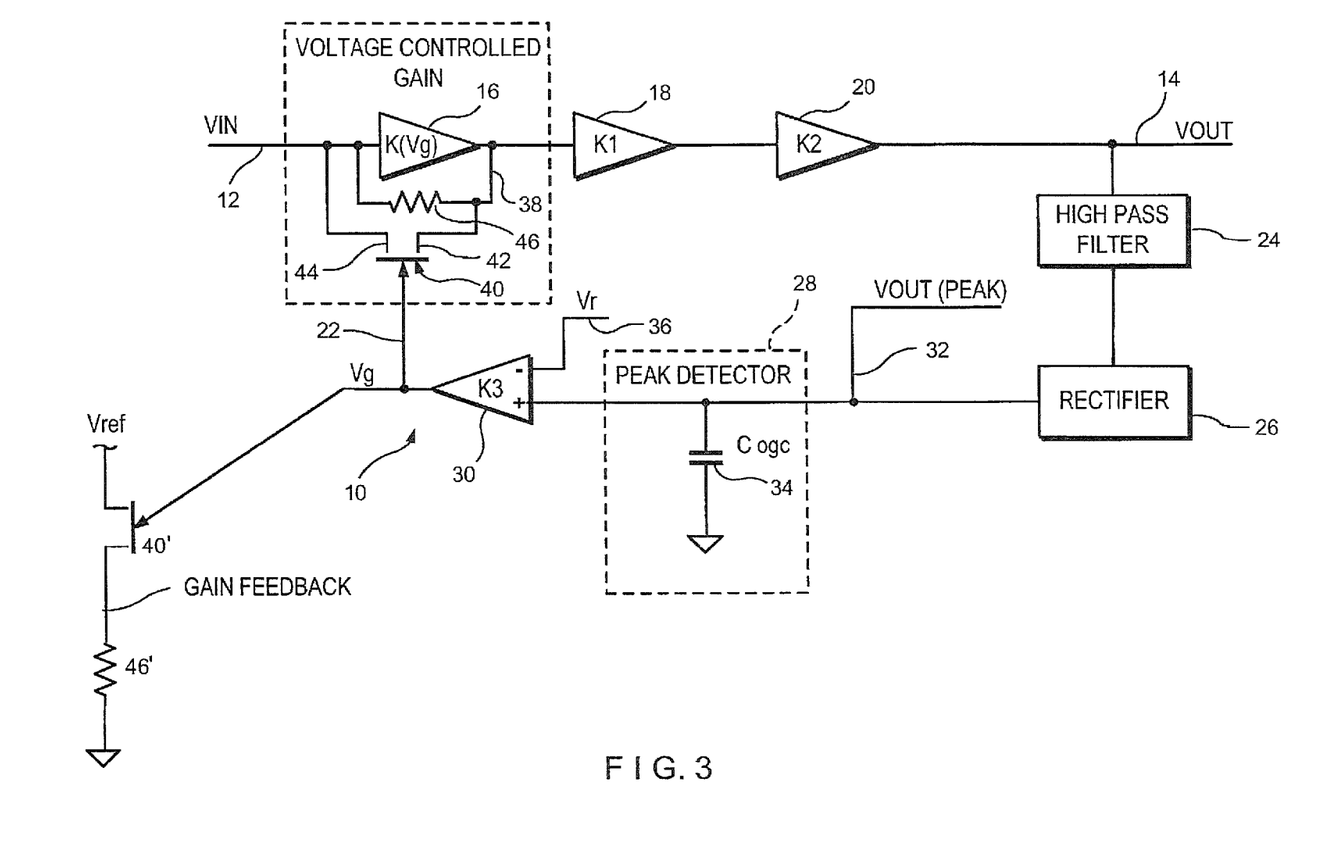
FIG. 3 shows an exemplary schematic of an additional AGC according to the exemplary embodiments of the present invention.

As illustrated in FIG. 3, an AGC circuit 10 is utilized to control the gain in a laser scanning system receiver. The block diagram represents a single feedback path control circuit with an input signal 12 (VIN) and output signal 14 (VOUT). The receiver comprises an amplifier section having at least three amplifiers 16, 18, and 20. It should be noted that the action of the AGC is not limited by the number of amplifier stages used in the receiver. The total number of amplifier stages used, depends on the gain limitation of each stage and the maximum receiver gain required by the application. The voltage gains of amplifiers 18 and 20 are fixed at K1 and K2, respectively, while the voltage gain K(Vg), of amplifier 16 is variable and controlled by error voltage signal 22 (Vg). The output signal 14 is sensed in a feedback path comprising high pass filter 24, rectifier 26, peak-detector 28, and error amplifier 30 having a gain K3. The output of the receiver 14 is high pass filtered to prevent any low frequency components of the signal, such as those signals that are received due to ambient light in the scanner's environment, from interfering with proper gain adjustment of the receiver. The output of the high pass filter 24 contains the alternating current (a.c.) component of the received signal 14 resulting from the bar code being scanned. This signal is rectified using a half wave rectifier 26. The output of the rectifier 26 is used to charge AGC capacitor 34 which includes a peak detector 28. The AGC capacitor 34, at steady state, will be charged to a d.c. voltage (VOUT(PEAK)) 32 which will be proportional to the average peak amplitude of the received signal. The charge rate of the AGC capacitor 34, which determines the attack time of the AGC, is determined by the output impedance and the cutoff frequency of the high pass filter 24. The attack time of this AGC can be reduced, at the expense of accuracy, by maximizing the amount of signal that will pass through the filter 24. This can be achieved by reducing the cutoff frequency of filter 24, and by reducing its output impedance. The automatic gain control action occurs dynamically as amplifier 30 compares the voltage difference between the average peak voltage signal 32 present on AGC capacitor 34, and a fixed reference voltage 36 (Vr), that for example, may be 1.2 volts dc. Essentially, the gain of amplifier 16 and hence overall receiver gain, is adjusted as amplifier 30 minimizes the voltage difference between voltage signals 36 and 32. The error voltage signal 22 is indicative of this voltage difference, is generated from amplifier 30 and is used to control the resistance in the feedback 38 of amplifier 16. To adjust the gain, error voltage signal 22 is input to the gate of transistor 40, and due to the characteristics of transistor 40, dynamically controls the resistance between its drain and source terminals 42 and 44. This controllable resistance is connected in parallel with resistor 46 in the feedback path 38 and can therefore vary the gain (Vg) of amplifier 16. It should be noted that any means for automatically adjusting the gain of amplifier 16 using error voltage signal 22 is acceptable. For instance, in the present embodiment a JFET operating as a voltage controlled resistor is used. Other types of transistors or integrated circuits can be used to accomplish the same gain adjustment. As a result of minimizing the voltage difference present at the inputs of amplifier 30, the output signal 14 is regulated at a constant amplitude. Note that in this configuration, the output signal 14 will be unaffected by fluctuations in input signal 12.

In the exemplary embodiment of FIG. 3, an identical JFET 40' is also connected in parallel to the output of amplifier 30. The receiver's gain may be estimated by measuring the feedback voltage. With the voltage signal, the "on resistance" of the JFET 40' may be calculated. With this resistance, receiver gain may be calculated based on the fact that resistance and receiver gain are proportional.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
   determining a range estimate from a scanning device to an object to be scanned, said determining is based on a gain measurement of an initial scan of the object; and
   receiving, by a controller from an automatic gain control, an input corresponding to the range estimate from the scanning device to the object
   adjusting, by the controller, a scan amplitude of a movable scanning mirror in the scanning device based on the input from the automatic gain control corresponding to the determined range estimate.

2. The method of claim 1, wherein the range estimate is one of a plurality of predetermined ranges.

3. The method of claim 1, wherein the setting is a receiver bandwidth of the scanning device.

4. The method of claim 3, further comprising:
   adjusting a margin timeout of the scanning device based on the adjustment of the receiver bandwidth.

5. The method of claim 1, wherein the setting is a power level of the scanning device.

6. The method of claim 5, wherein the adjusting includes selectively turning off a laser beam of the scanning device for a predetermined number of scans.

7. The method of claim 1, wherein the setting is a beam clipping point of the scanning device.

\* \* \* \* \*